(12) United States Patent
Li (10) Patent No.: US 7,066,593 B1
(45) Date of Patent: Jun. 27, 2006

(54) EYEGLASSES FRAME ASSEMBLY

(75) Inventor: Hsing-Chen Li, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 11/017,953

(22) Filed: Dec. 22, 2004

(51) Int. Cl.
*G02C 1/08* (2006.01)

(52) U.S. Cl. .......................................... 351/92; 351/90
(58) Field of Classification Search ................. 351/90, 351/92, 94, 98, 124, 128, 41
See application file for complete search history.

(56) References Cited

U.S. PATENT DOCUMENTS

| | | | | |
|---|---|---|---|---|
| 5,098,180 | A * | 3/1992 | Tobey | .......................... 351/97 |
| 5,270,743 | A * | 12/1993 | Hofmair et al. | ............... 351/86 |
| 5,971,536 | A * | 10/1999 | Chiu | .......................... 351/41 |
| 6,979,082 | B1 * | 12/2005 | Chen | .......................... 351/90 |

* cited by examiner

*Primary Examiner*—Hung Xuan Dang
(74) *Attorney, Agent, or Firm*—Rosenberg, Klein & Lee (57) ABSTRACT

An eyeglasses frame assembly is assembled by an upper half portion and a lower half portion. The upper half portion is provided with a central hollow in the bridge, two opposite catching blocks are provided in the central hollow, and each catching block is provided with a barb. A pair of downward against blocks and an inserting rod are provided at the bottom of each end section of the upper half portion, and a screw hole is provided in each end of the upper half portion. The lower half portion is provided with two opposite protruding members at the bridge, a through hole is formed between two opposite protruding members, and each protruding member is provided with a stopping article. A pair of upward against blocks are provided on each end of the lower half portion, a concave is formed between the pair of upward against blocks, and a screw hole is provided in each end of the lower half portion.

2 Claims, 11 Drawing Sheets

EYEGLASSES FRAME ASSEMBLY

BACKGROUND OF THE INVENTION

1. Field of the Invention

The present invention relates to an eyeglasses frame assembly with innovatory convenience and security features, and more particularly, the present invention is directed to an eyeglasses frame assembly which is provided with a bridge coupling structure and a end coupling structure for the eyeglasses frame assembly to be easily and promptly assembled or disassembled and for a temple to secured to each end of the eyeglasses frame assembly.

2. Description of the Related Art

Figure 1:
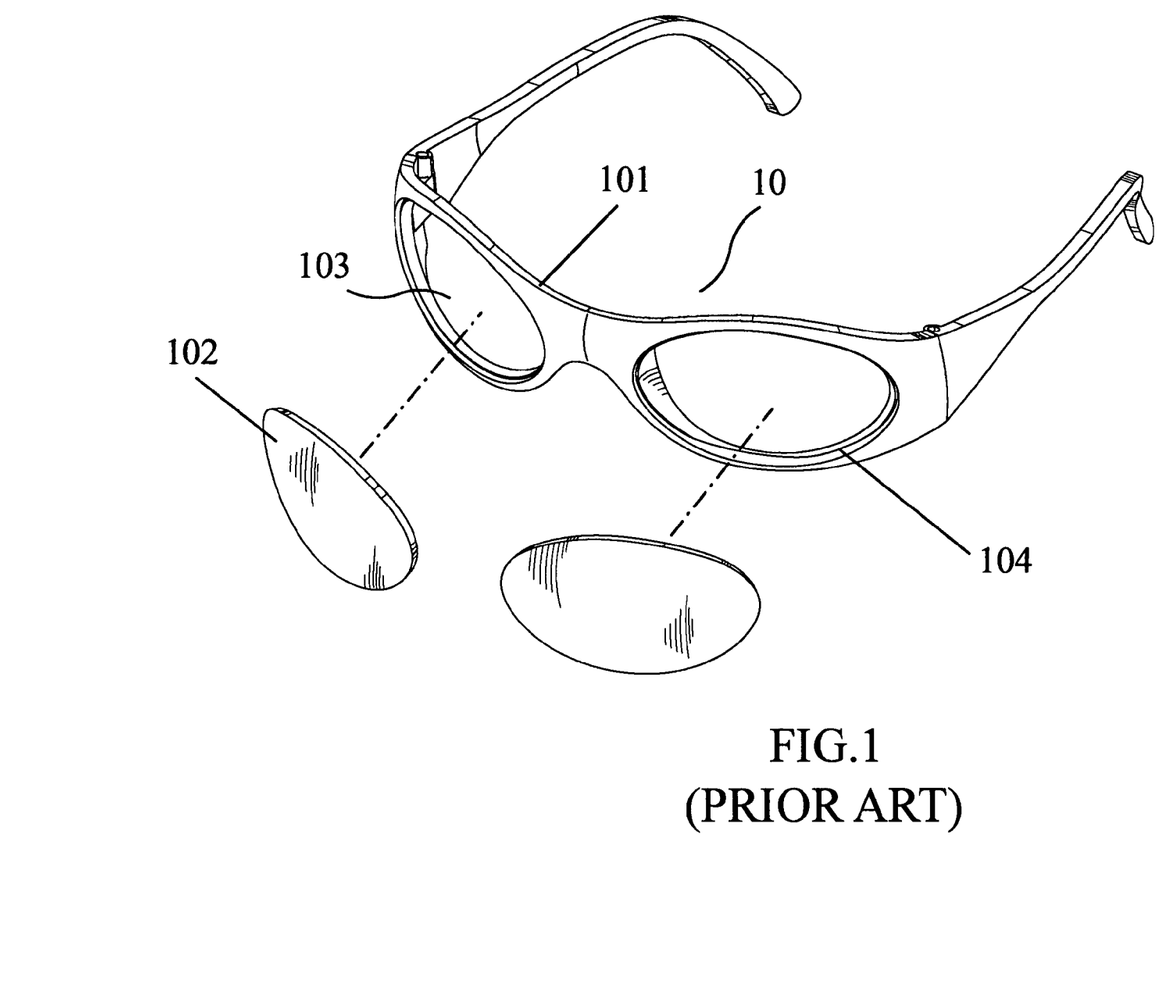
FIG. 1 is a perspective exploded view of a conventional one-piece eyeglasses.

Eyeglasses are indispensable for modern people in daily life. Generally, a conventional frame 101 of an eyeglasses 10 is made of metal or plastic material and is made into one piece. Referring to FIG. 1, in order for a pair of lenses 102 to be respectively inlaid in the hollows 103 of the frame 101, the size of each lens 102 must accord with that of each hollow 103 because the size of each hollow 103 is fixed. When being assembled, each lens 102 is forced to be inlaid in the groove 104 of each hollow 103.

Although the above-mentioned assembling manner can obtain the purpose of finishing assembling an eyeglasses 10, it causes much trouble and inconvenience to assemble the lenses 102 with the frame 101 by forcing each lens 102 to be inlaid in the groove 104 of each hollow 103. Moreover, it would cause damage to the lenses 102. Besides, the frame 101 is made to be one single color after formation, and it must be additionally painted in order to become colorific. It not only causes inconvenience but also costs more.

Figure 2:
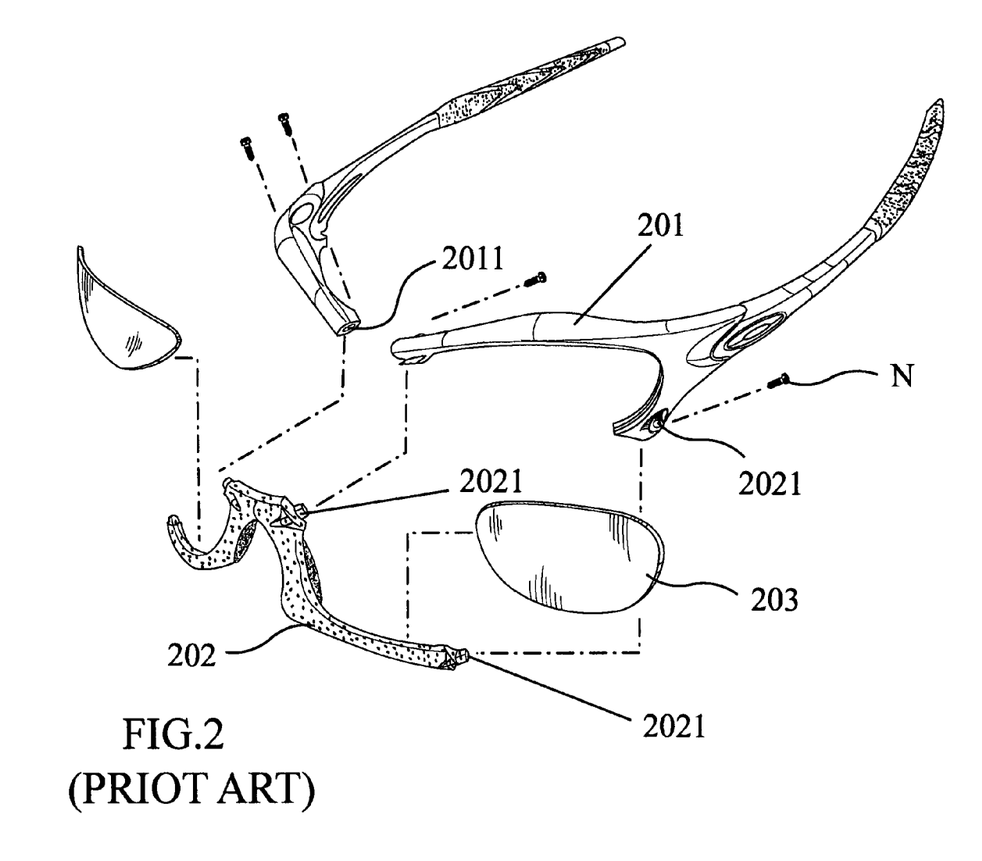
FIG. 2 is a perspective exploded view of another conventional eyeglasses assembly.
Figures 3, 4:
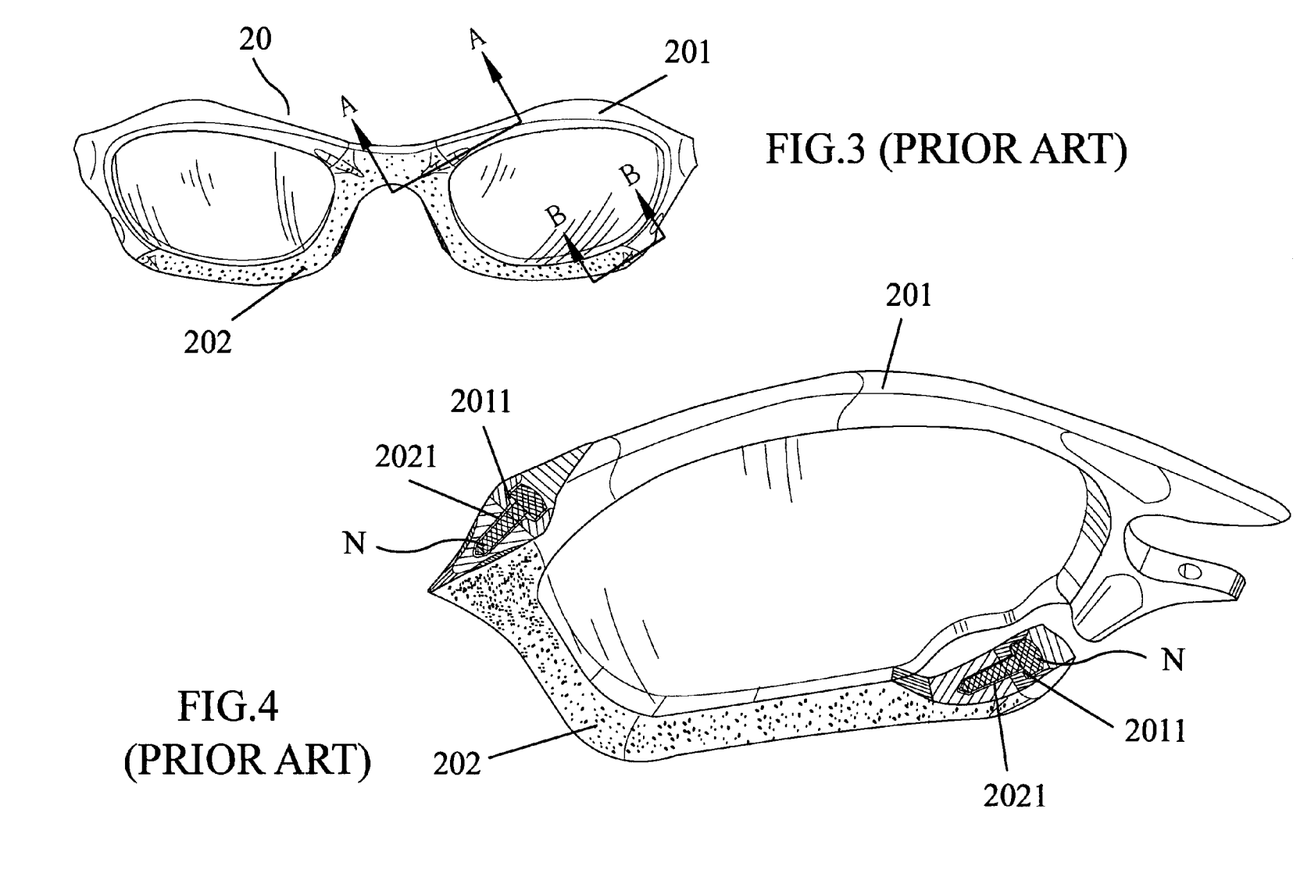
FIG. 3 is a front schematic view of another conventional eyeglasses assembly in assembled configuration.
FIG. 4 is a partial cross-sectional view taken along lines A—A and B—B in FIG. 3.

Therefore, another conventional eyeglasses frame assembly 20 was invented to overcome the drawbacks. Referring to FIGS. 2, 3 and 4, the conventional eyeglasses frame assembly 20 is provided with screws holes 2011 and 2021 respectively at both ends of an upper half frame 201 and a lower half frame 202, and a screw N is penetrated through the screw holes 2011 and 2021, so as to thereby assemble the upper half frame 201 with the lower half frame 202.

Although the above-mentioned another conventional eyeglasses frame assembly 20 can effectively overcome the trouble in securing lenses 203, screws N are needed to assemble the upper half frame 201 with the lower half frame 202, it still causes much trouble and inconvenience in assembly, and it may not be aesthetically pleasing to some customers.

SUMMARY OF THE INVENTION

Therefore, the present invention is designed to provide an eyeglasses frame assembly that can substantially obviate the drawbacks of the related conventional arts.

An objective of the present invention is to provide an eyeglasses frame assembly which includes an upper half portion and a lower half portion to be convenient for changing different colors for aesthetic appearance of the eyeglasses frame assembly.

Another objective of the present invention is to provide an eyeglasses frame assembly which is provided with a bridge coupling structure for the upper half portion and the lower half portion to be easily and promptly assembled or disassembled.

Yet another objective of the present invention is to provide an eyeglasses frame assembly which is provided with an end coupling structure for the upper half portion and the lower half portion to be easily and promptly assembled or disassembled and for a temple to be pivotally secured to each end of the eyeglasses frame assembly.

A further objective of the present invention is to provide an eyeglasses frame assembly which can reduce cost and labor of production.

Accordingly, an eyeglasses frame assembly in the present invention is assembled by an upper half portion and a lower half portion. The upper half portion is provided with a central hollow in the bridge, two opposite catching blocks are provided in the central hollow, each catching block is provided with a barb, and downward elongated grooves are provided in the upper half portion. A pair of downward against blocks and an inserting rod are provided at the bottom of each end section of the upper half portion, and a screw hole is provided in each end of the upper half portion. The lower half portion is provided with two opposite protruding members at the bridge, a through hole is formed between two opposite protruding members, each protruding member is provided with a stopping article, and upward elongated grooves are provided in the lower half portion. A pair of upward against blocks are provided on each end of the lower half portion, a concave is formed between the pair of upward against blocks, and a screw hole is provided in each end of the lower half portion.

BRIEF DESCRIPTION OF THE DRAWINGS

Other features and advantages of the present invention will become apparent in the following detailed description of the preferred embodiments with reference to the accompanying drawings, in which:

FIG. 7-1 is a partially enlarged view taken from the circle in FIG. 7;

FIG. 10-1 is a partially enlarged view taken from the circle in FIG. 10;

DETAILED DESCRIPTION OF THE PREFERRED EMBODIMENTS

The present invention of an eyeglasses frame assembly is assembled by an upper half portion 1 and a lower half portion 2 and is provided with a bridge coupling structure for the upper half portion 1 and a lower half portion 2 to be easily and promptly assembled or disassembled.

Figure 5:
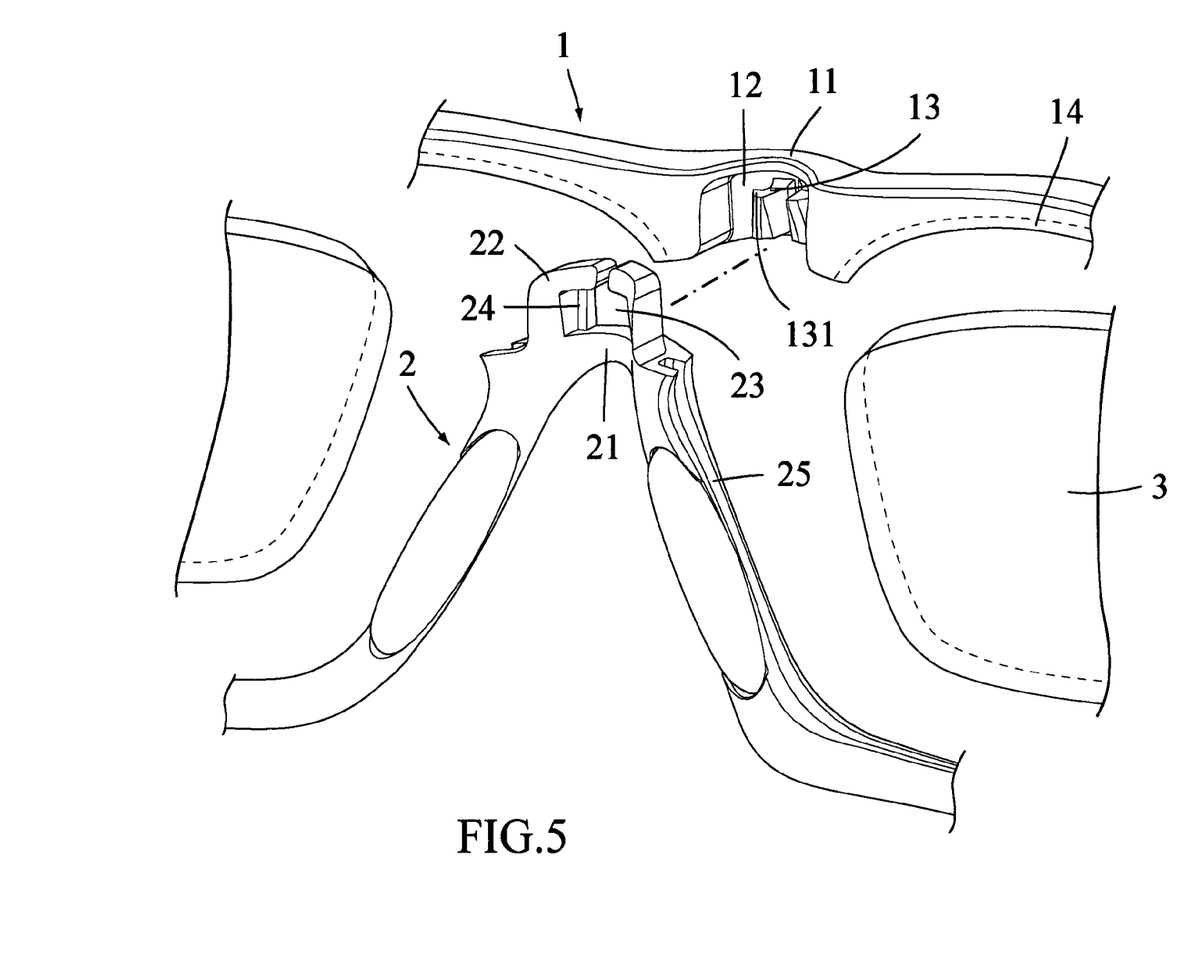
FIG. 5 is a perspective exploded view of an embodiment of the bridge coupling structure of the eyeglasses frame assembly in accordance with the present invention.

Referring to FIG. 5 of an embodiment of the bridge coupling structure of the eyeglasses frame assembly in the present invention, the upper half portion 1 is provided with a central hollow 12 in the bridge 11, two opposite catching blocks 13 are provided in the central hollow 12, each catching block 13 is provided with a barb 131, and downward elongated grooves 14 are provided in the upper half portion 1. The lower half portion 2 is provided with two opposite protruding members 22 at the bridge 21, a through hole 23 is formed between two opposite protruding members 22, each protruding member 22 is provided with a stopping article 24, and upward elongated grooves 25 are provided in the lower half portion 2.

A pair of lenses 3 may be colorful or transparent, and their shapes respectively accord with those of the elongated grooves 14 and 25 of the upper half portion 1 and the lower half portion 2.

Figure 6:
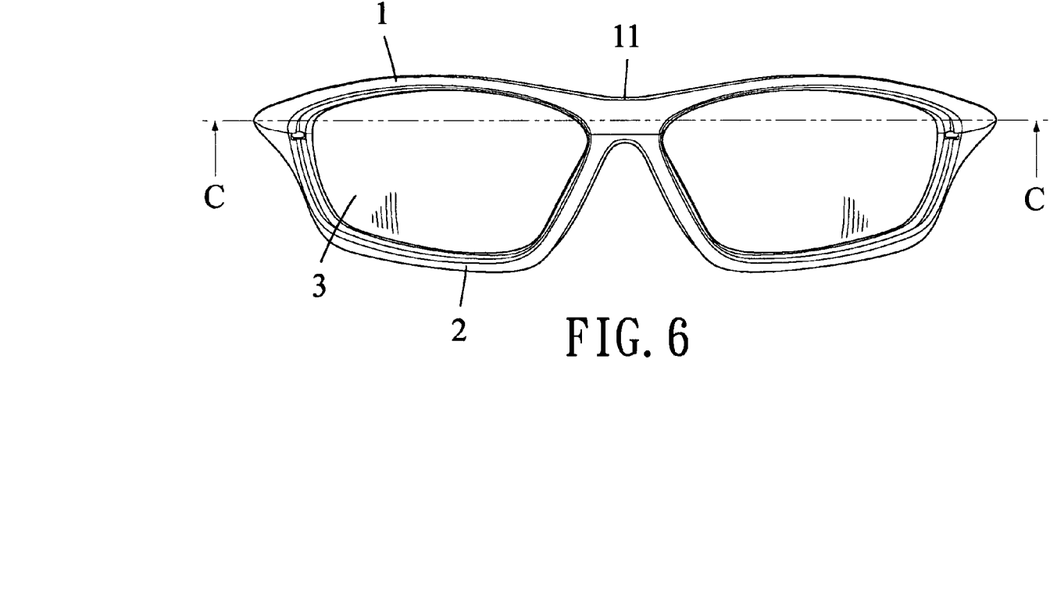
FIG. 6 is a front view of an embodiment of the eyeglasses frame assembly in assembled configuration in accordance with the present invention.
Figure 7:
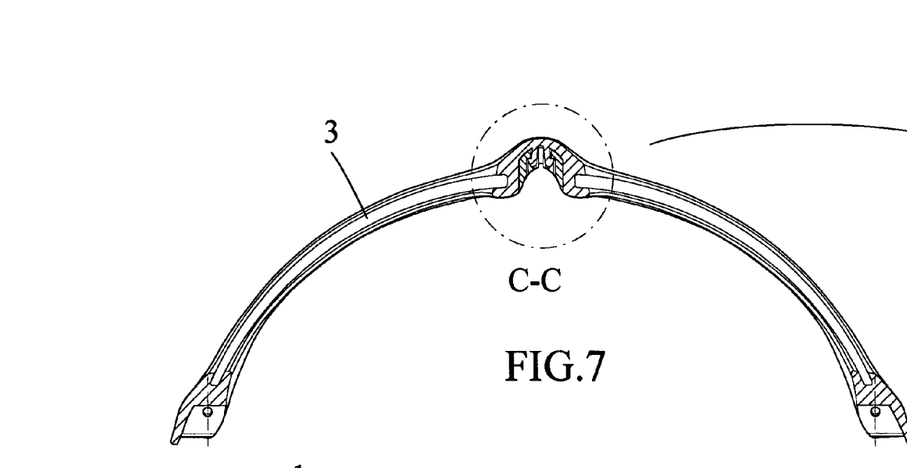
FIG. 7 is a sectional view of an embodiment of the eyeglasses frame assembly in assembled configuration in accordance with the present invention taken along line C—C in FIG. 6.
Figure 71:
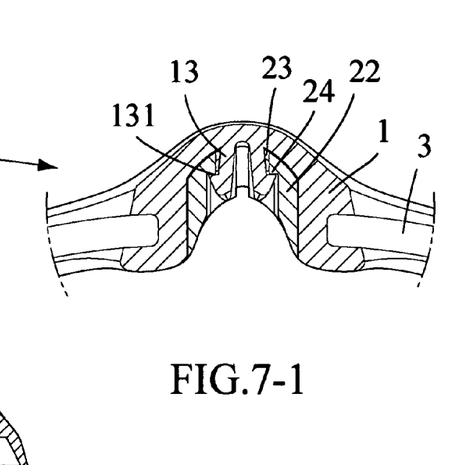

While being assembled, referring to FIGS. 6, 7 and 7-1, two opposite catching blocks 13 are inserted into the through hole 23 for the barbs 131 to respectively catch the stopping articles 24 and the protruding members 22 to be inlaid in the central hollow 12, so as for the upper half portion 1 and the lower half portion 2 to be firmly assembled. At last, the pair of lenses 3 are respectively inlaid in the elongated grooves 14 and 25 of the upper half portion 1 and the lower half portion 2.

Figure 8:
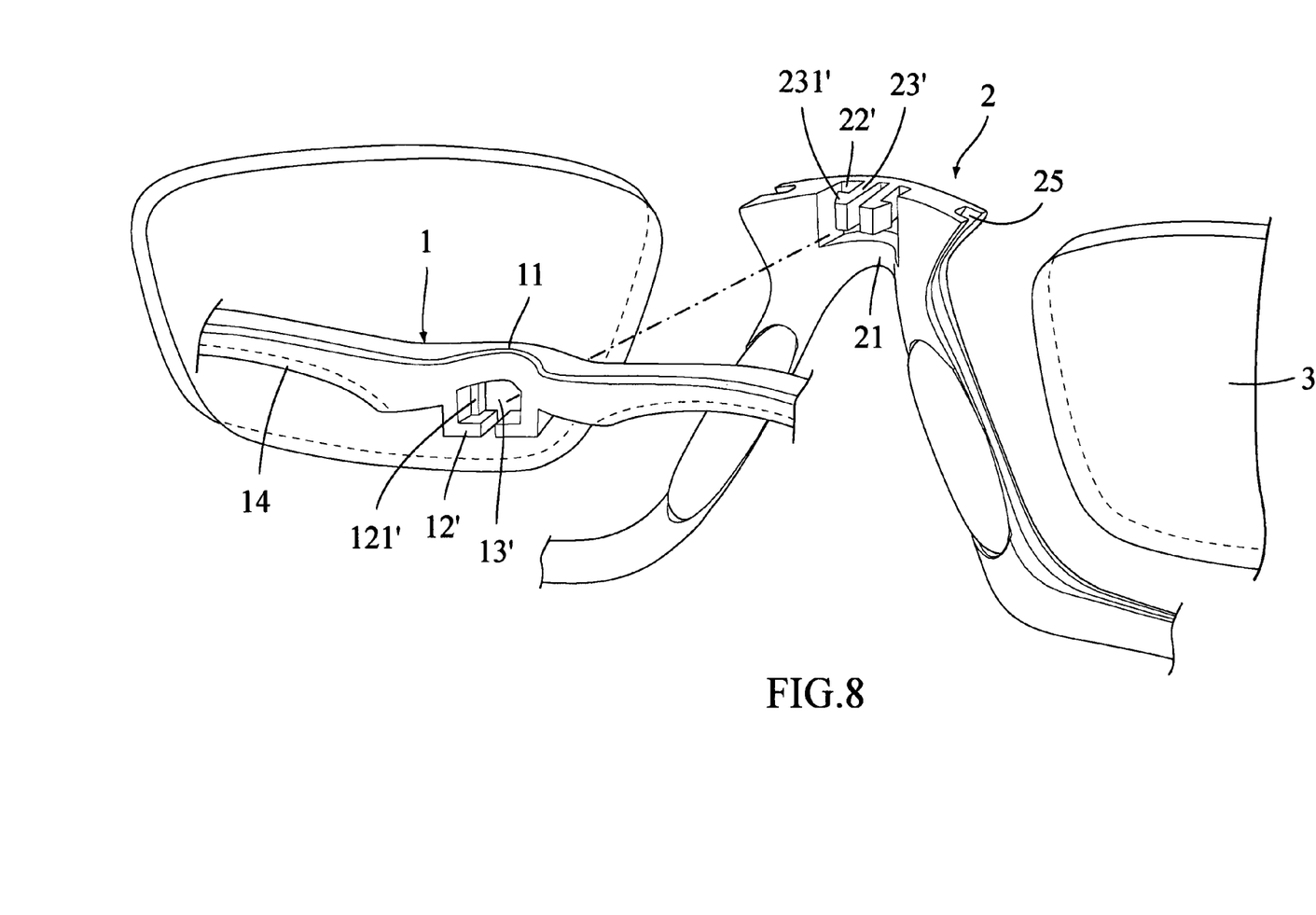
FIG. 8 is a perspective exploded view of another embodiment of the bridge coupling structure of the eyeglasses frame assembly in accordance with the present invention.

Referring to FIG. 8 of another embodiment of the bridge coupling structure of the eyeglasses frame assembly in the present invention, the upper half portion 1 is provided with two opposite protruding members 12' at the bridge 11, a through hole 13' is formed between two opposite protruding members 12', each protruding member 12' is provided with a stopping article 121', and downward elongated grooves 14 are provided in the upper half portion 1. The lower half portion 2 is provided with a central hollow 22' at the bridge 21, two opposite catching blocks 23' are provided in the central hollow 22', each catching block 23' is provided with a barb 231', and upward elongated grooves 25 are provided in the lower half portion 2.

A pair of lenses 3 may be colorful or transparent, and their shapes respectively accord with those of the elongated grooves 14 and 25 of the upper half portion 1 and the lower half portion 2.

Figure 9:
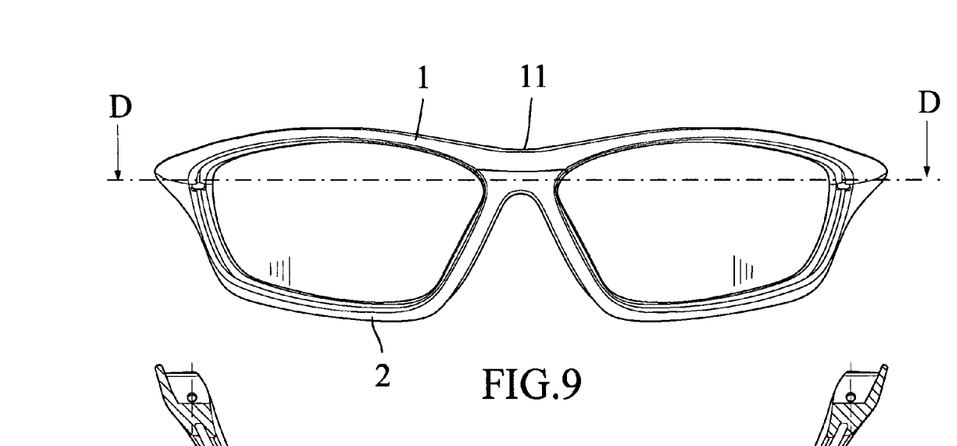
FIG. 9 is a front view of another embodiment of the eyeglasses frame assembly in assembled configuration in accordance with the present invention.
Figure 10:
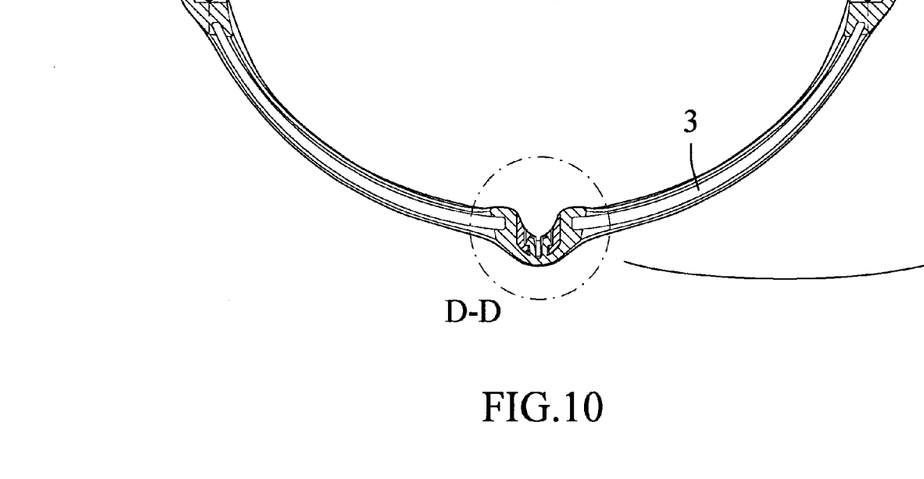
FIG. 10 is a sectional view taken along line D—D in FIG. 9 of another embodiment of the eyeglasses frame assembly in assembled configuration in accordance with the present invention.
Figure 101:
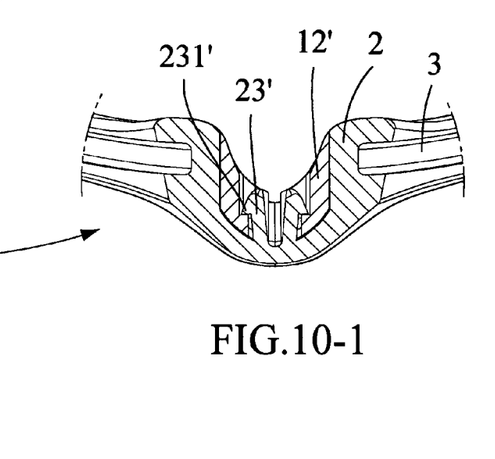

While being assembled, referring to FIGS. 9, 10 and 10-1, two opposite catching blocks 23' are inserted into the through hole 13' for the barbs 231' to respectively catch the stopping articles 121' and the protruding members 12' to be inlaid in the central hollow 22', so as for the upper half portion 1 and the lower half portion 2 to be firmly assembled. At last, the pair of lenses 3 are respectively inlaid in the elongated grooves 14 and 25 of the upper half portion 1 and the lower half portion 2.

The present invention of the eyeglasses frame assembly is provided with an end coupling structure for the upper half portion 1 and the lower half portion 2 to be easily and promptly assembled or disassembled and convenient for a pair of temples 4 to be secured to both ends of the eyeglasses frame assembly.

Figure 11:
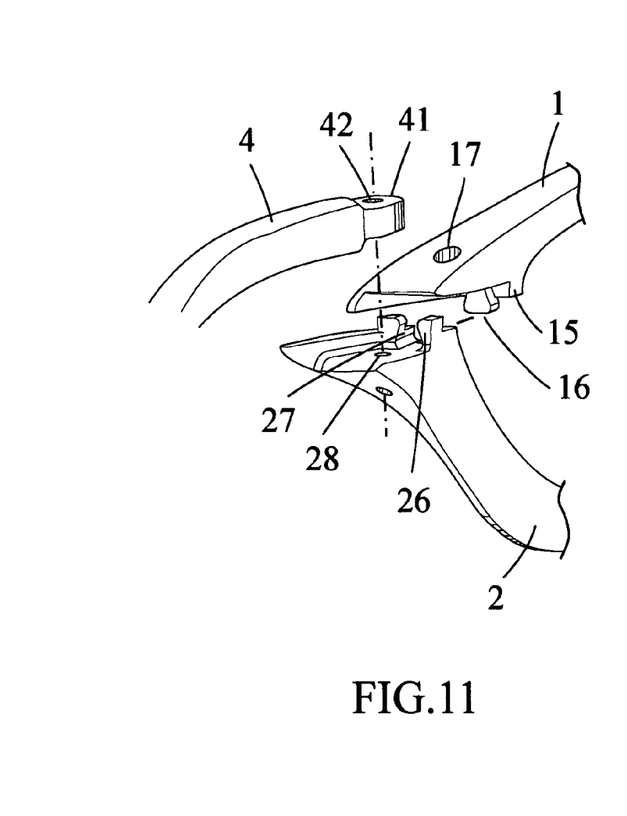
FIG. 11 is a perspective exploded view of an embodiment of the end coupling structure of the eyeglasses frame assembly and a temple in accordance with the present invention.

Referring to FIG. 11 of an embodiment of the end coupling structure of the eyeglasses frame assembly in the present invention, the upper half portion 1 is provided with a pair of downward against blocks 15 and an inserting rod 16 at the bottom of each end section, and a screw hole 17 is provided in each end of the upper half portion 1. The lower half portion 2 is provided a pair of upward against blocks 26 on each end, a concave 27 is formed between the pair of upward against blocks 26, and a screw hole 28 is provided in each end of the lower half portion 2.

Each temple 4 is provided with a flat end 41, and a screw hole 42 is provided in the flat end 41.

Figure 12:
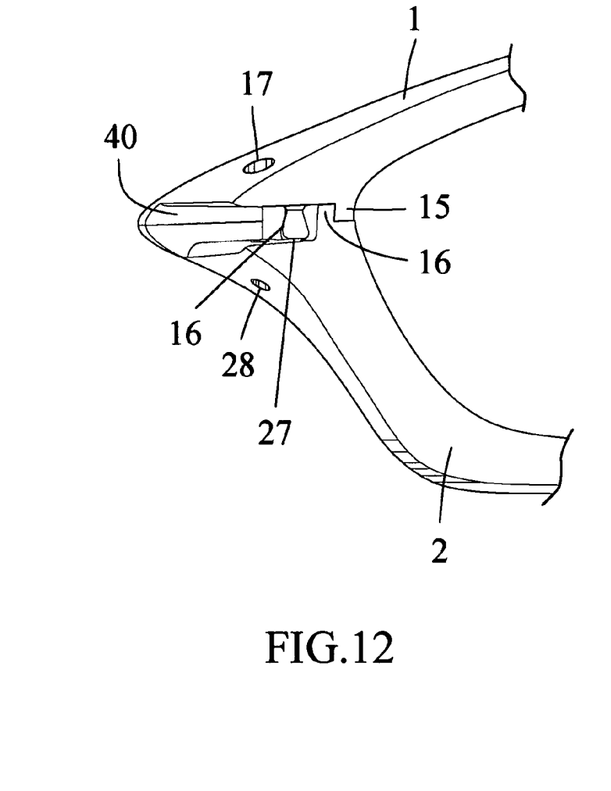
FIG. 12 is a perspective view of an embodiment of the end coupling structure of the eyeglasses frame assembly in assembled configuration in accordance with the present invention.
Figures 13, 14:
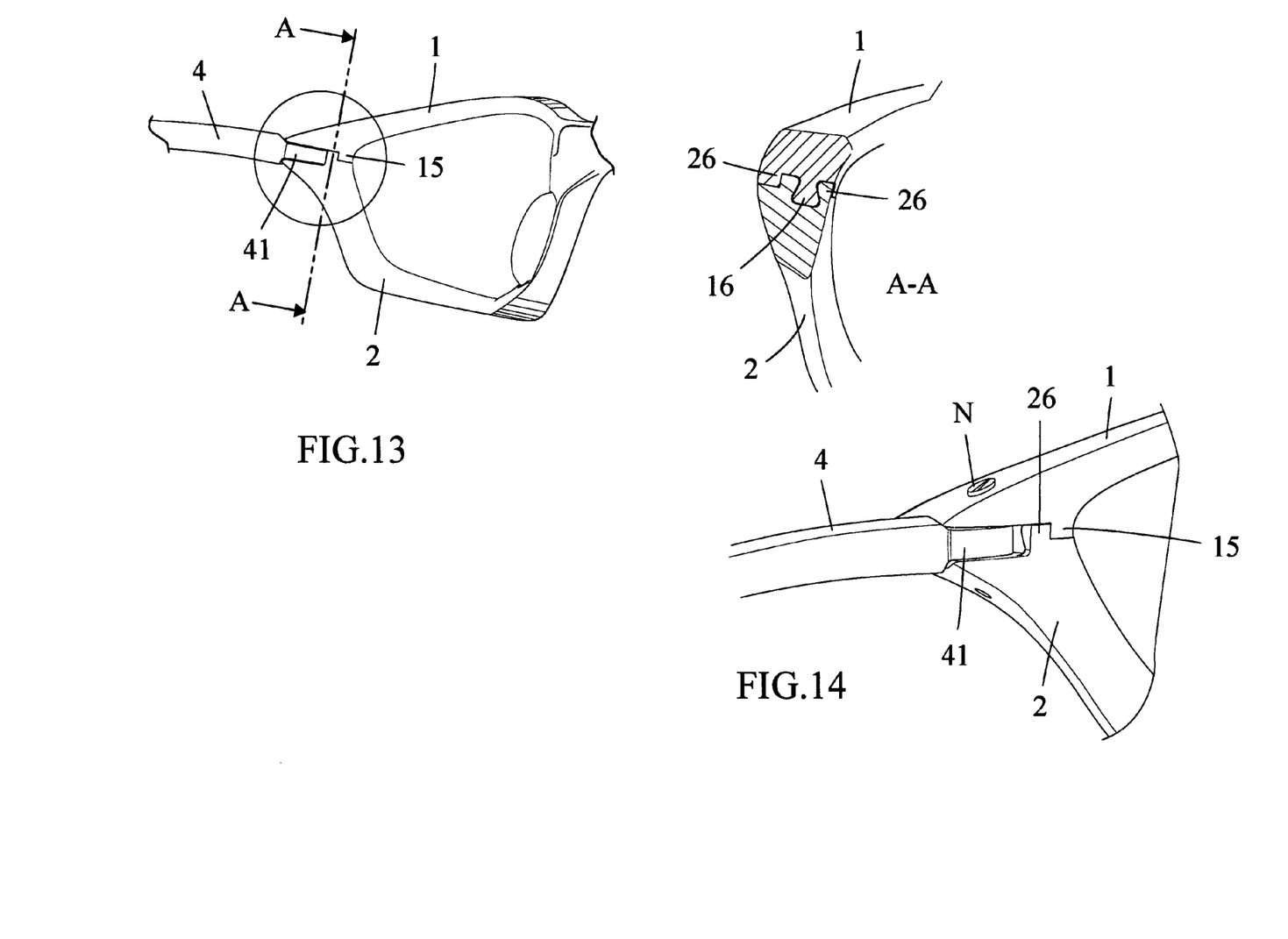
FIG. 13 is a cross-sectional view taken along line A—A of an embodiment of the end coupling structure of the eyeglasses frame assembly being assembled by a temple in accordance with the present invention.
FIG. 14 is a perspective view of an embodiment of the end coupling structure of the eyeglasses frame assembly in assembled configuration being assembled by a temple in accordance with the present invention.

While being assembled, referring to FIGS. 12, 13 and 14, each inserting rod 16 of the upper half portion 1 is inlaid in each concave 27 of the lower half portion 2, and the front surface of each pair of downward against blocks 15 are against on the rear surface of each pair of upward against blocks 26, so as for each end of the upper half portion 1 and the lower half portion 2 to be firmly assembled. A room 40 is formed when each end of the upper half portion 1 and the lower half portion 2 being assembled for receiving the flat end 41 of a temple 4, and a screw N is screwed through registered screw holes 17, 28 and 42 to pivotally secure the temple 4 to each end of the eyeglasses frame assembly.

Figure 15:
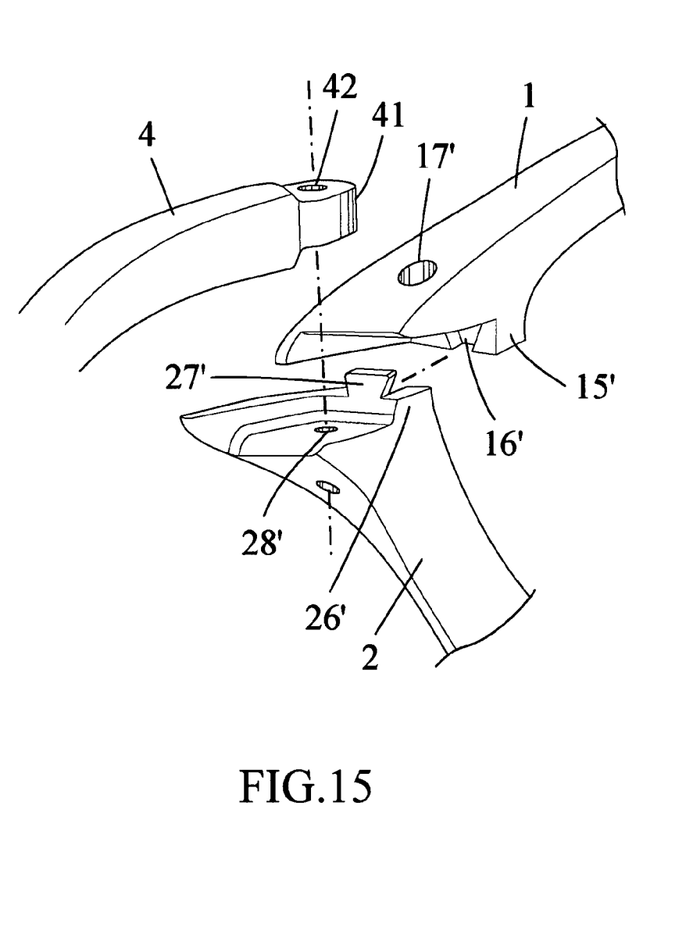
FIG. 15 is a perspective exploded view of another embodiment of the end coupling structure of the eyeglasses frame assembly and a temple in accordance with the present invention.

Referring to FIG. 15 of another embodiment of the end coupling structure of the eyeglasses frame assembly in the present invention, the upper half portion 1 is provided with a pair of downward against blocks 15' at the bottom of each end section, a concave 16' is formed between the pair of downward against blocks 15', and a screw hole 17' is provided in each end of the upper half portion 1. The lower half portion 2 is provided with a pair of upward against blocks 26' on each end, an inserting rod 27' is provided between the pair of upward against blocks 26', and a screw hole 28' is provided in each end of the lower half portion 2.

Each temple 4 is provided with a flat end 41, and a screw hole 42 is provided in the flat end 41.

Figure 16:
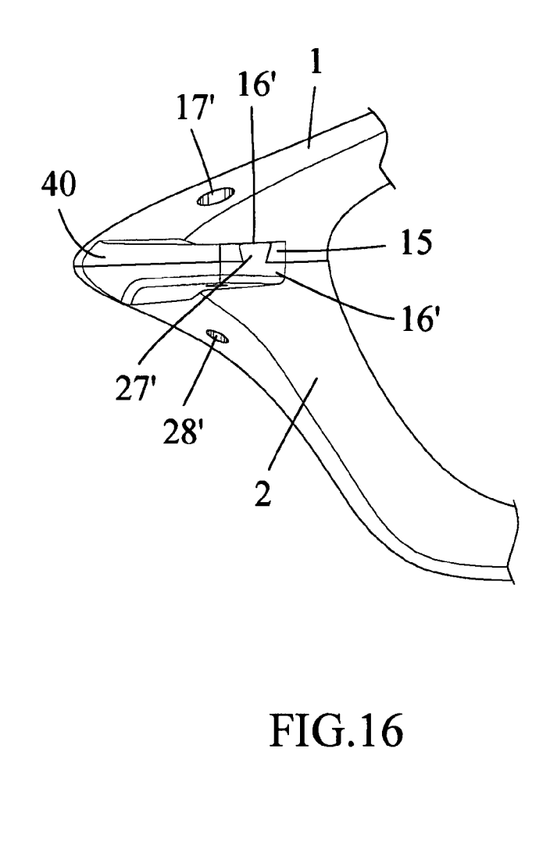
FIG. 16 is a perspective view of another embodiment of the end coupling structure of the eyeglasses frame assembly in assembled configuration in accordance with the present invention.
Figure 17:
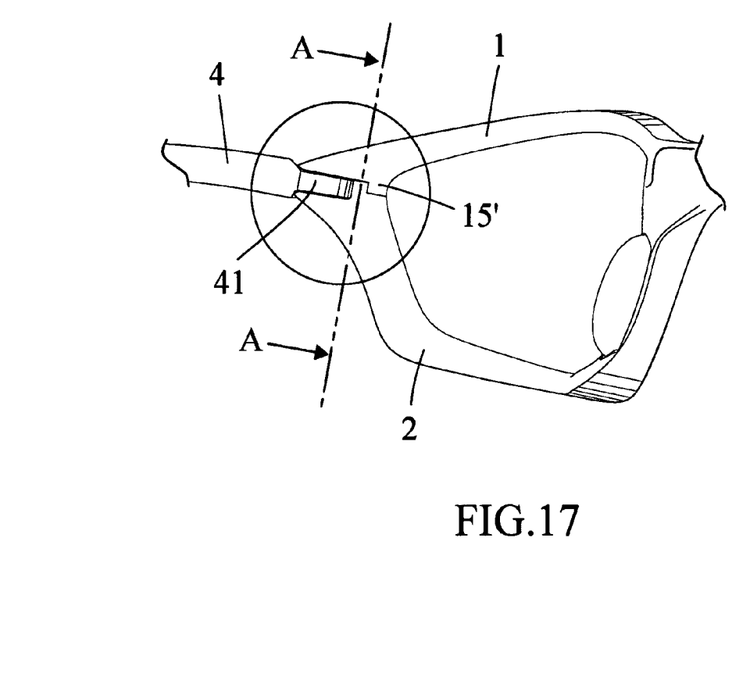
FIG. 17 is a cross-sectional view taken along line A—A of another embodiment of the end coupling structure of the eyeglasses frame assembly being assembled by a temple in accordance with the present invention; and, FIG. 18 is a perspective view of another embodiment of the end coupling structure of the eyeglasses frame assembly in assembled configuration being assembled by a temple in accordance with the present invention.
Figure 18:
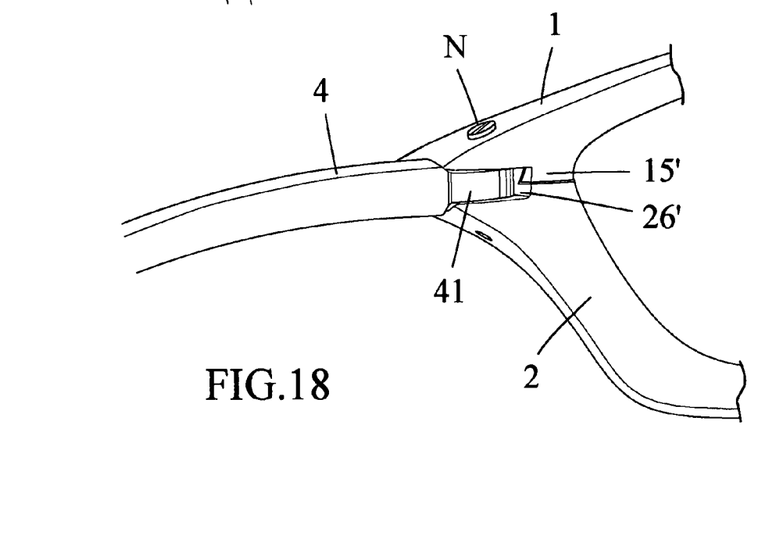

While being assembled, referring to FIGS. 16, 17 and 18, each inserting rod 27' of the lower half portion 2 is inlaid in each concave 16' of the upper half portion 1, and the front surface of each pair of upward against blocks 26' are against on the rear surface of each pair of downward against blocks 15', so as for each end of the upper half portion 1 and the lower half portion 2 to be firmly assembled. A room 40 is formed when each end of the upper half portion 1 and the lower half portion 2 being assembled for receiving the flat end 41 of a temple 4, and a screw N is screwed through registered screw holes 17', 28' and 42 to pivotally secure the temple 4 to each end of the eyeglasses frame assembly.

While the preferred embodiments of the invention have been described above, it will be recognized and understood that various modifications may be made thereto, and the appended claims are intended to cover all such modifications which may fall within the spirit and scope of the invention.

What is claimed is:

1. An eyeglasses frame assembly comprising:

an upper half portion being provided with a central hollow in a bridge, two opposite catching blocks being provided in said central hollow, and each said catching block being provided with a barb; and, a lower half portion being provided with two opposite protruding members at a bridge, a through hole being formed between said two opposite protruding members, and each said protruding member being provided with a stopping article.

2. An eyeglasses frame assembly comprising:

An upper half portion being provided with two opposite protruding members at a bridge, a through hole is formed between said two opposite protruding members, and each said protruding member is provided with a stopping article, and A lower half portion being provided with a central hollow at a bridge, two opposite catching blocks are provided in said central hollow, and each said catching block is provided with a barb.

* * * * *